(12) United States Patent
Ayukawa et al.

(10) Patent No.: US 6,510,457 B1
(45) Date of Patent: Jan. 21, 2003

(54) DATA ANALYSIS METHOD AND APPARATUS FOR DATA MINING

(75) Inventors: Erika Ayukawa, Kawasaki (JP); Toyohisa Morita, Sagamihara (JP); Akira Maeda, Yokohama (JP); Yukiyasu Ito, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/332,896

(22) Filed: Jun. 15, 1999

(30) Foreign Application Priority Data

Jun. 17, 1998 (JP) .......................................... 10-186919

(51) Int. Cl.⁷ .............................................. G06F 15/16
(52) U.S. Cl. ........................... 709/217; 709/224; 707/6; 707/2; 707/10; 707/101; 706/25; 706/47
(58) Field of Search ........................ 79/217, 223, 224; 707/6, 10, 101, 505, 204, 2, 103; 706/25, 47; 379/34

(56) References Cited

U.S. PATENT DOCUMENTS

| | | | |
|---|---|---|---|
| 5,764,975 A | * | 6/1998 | Taniguchi et al. |
| 5,765,028 A | * | 6/1998 | Gladden |
| 5,918,232 A | * | 6/1999 | Pouschine et al. |
| 5,978,788 A | * | 11/1999 | Castelle et al. |
| 6,112,238 A | * | 8/2000 | Boyd et al. |
| 6,151,601 A | * | 11/2000 | Papierniak et al. |
| 6,205,451 B1 | * | 3/2001 | Norcott et al. |
| 6,282,267 B1 | * | 8/2001 | Nolting |
| 6,301,591 B2 | * | 10/2001 | Katsumata et al. |
| 6,321,217 B1 | * | 11/2001 | Maeda et al. |
| 6,334,132 B1 | * | 12/2001 | Weeks |

FOREIGN PATENT DOCUMENTS

JP            7-93159         4/1995

OTHER PUBLICATIONS

"Data Warehouse", Japan Management Science Institute, 1996, Y. Ishii, pp. 232–237.
"Visualization of Association Rules", Shingaku Gishou, DE95–6, 1995, T. Fukuda et al, pp. 41–48.

* cited by examiner

Primary Examiner—Ayaz Sheikh
Assistant Examiner—Oanh Duong
(74) Attorney, Agent, or Firm—Mattingly, Stanger & Malur, P.C.

(57) ABSTRACT

Data analysis using online data summarization processing and rule-based data characteristic detection is performed at the time the transaction data is input. Online data input through an input device of a first server is stored into a transaction data memory device. A data summarizing device carries out summarization processing of online data according to stored parameters, and the resultant summary data is stored into a summary data memory device. A data joining device joins the summary data stored in the summary data memory device and the summary data transferred from a second server for the purpose of updating. In the first server, using rules generated by a rule generating device and stored in rule memory device, a detecting device detects characteristics of the summary data. Further, the results of data characteristic detection are sent to a client through.

15 Claims, 14 Drawing Sheets

FIG.8

SUMMARY KEY ITEM →

106

| START-OF-COMMUNICATION TIME | CALLING TELEPHONE NUMBER | TERMINATING TELEPHONE NUMBER | COMMUNICATION PERIOD | CLASS OF COMMUNICATION | ... |
|---|---|---|---|---|---|
| 01 : 17 : 06 | 1001933572 | 01073473322 | 00 : 26 : 05 | ORDINARY COMMUNICATION | ... |
| 01 : 35 : 11 | 1005660107 | 0442520062 | 00 : 05 : 14 | ORDINARY COMMUNICATION | ... |
| 02 : 20 : 45 | 1002120023 | 0507260348 | 00 : 17 : 20 | DATA COMMUNICATION | ... |
| 03 : 02 : 28 | 1003266347 | 0108352678 | 00 : 02 : 31 | ORDINARY COMMUNICATION | ... |
| 05 : 44 : 23 | 1003380885 | 0458335514 | 02 : 15 : 03 | DATA COMMUNICATION | ... |
| ... | ... | ... | ... | ... | ... |

SUMMARY (JOINING) KEY ITEM →

| COMMUNICATION CUSTOMER NUMBER | TOTAL COMMUNICATION PERIOD | MAXIMUM COMMUNICATION PERIOD | RATIO OF DATA COMMUNICATION (%) | ... |
|---|---|---|---|---|
| 1001001001 | 145:27:18 | 05:26:05 | 0 | ... |
| 1001001002 | 24:15:44 | 00:05:31 | 0 | ... |
| 1001001003 | 06:32:26 | 01:18:22 | 36 | ... |
| 1001001004 | 72:57:31 | 01:42:30 | 0 | ... |
| 1001001005 | 03:15:23 | 00:18:26 | 96 | ... |
| ... | | | | . . |

JOINING KEY ITEM →

| CUSTOMER NUMBER | TELEPHONE NUMBER | AGE | SEX | OCCUPATION | ... |
|---|---|---|---|---|---|
| 1 | 1001001001 | 52 | MALE | OFFICE WORKER | ... |
| 2 | 1001001002 | 42 | FEMALE | INDEPENDENT WORKER | ... |
| 3 | 1001001003 | 35 | FEMALE | OFFICE WORKER | ... |
| 4 | 1001001004 | 19 | MALE | STUDENT | ... |
| 5 | 1001001005 | 67 | MALE | WITHOUT OCCUPATION | ... |
| ... | ... | ... | ... | ... | ... |

| TELEPHONE NUMBER | CUSTOMER NUMBER | TOTAL COMMUNICATION PERIOD | MAXIMUM COMMUNICATION PERIOD | ... | AGE | SEX | ... |
|---|---|---|---|---|---|---|---|
| 1001001001 | 1 | 145:27:18 | 05:26:05 | ... | 25 | MALE | ... |
| 1001001002 | 2 | 24:15:44 | 00:05:31 | ... | 42 | FEMALE | ... |
| 1001001003 | 3 | 06:32:26 | 01:18:22 | ... | 35 | FEMALE | ... |
| 1001001004 | 4 | 72:57:31 | 01:42:30 | ... | 19 | MALE | ... |
| 1001001005 | 5 | 03:15:23 | 00:18:26 | ... | 67 | MALE | ... |
| ... | ... | ... | ... | ... | ... | ... | ... |

JOINING KEY ITEM → (TELEPHONE NUMBER)

REFERENCED FROM SUMMARY DATA: CUSTOMER NUMBER, TOTAL COMMUNICATION PERIOD, MAXIMUM COMMUNICATION PERIOD

REFERENCE FROM SECOND-SERVER DATA: AGE, SEX

| RULE NUMBER | CONDITION PART (A1 & A2 & ...) | | | | | | CONCLUSION PART | |
|---|---|---|---|---|---|---|---|---|
| | FIRST CONDITION (A1) | | SECOND CONDITION (A2) | | ... | | | |
| | ITEM NAME | CATEGORY VALUE | ITEM NAME | CATEGORY VALUE | | | ITEM NAME | CATEGORY VALUE |
| 1 | TOTAL COMMUNICATION PERIOD | MORE THAN 100 HOURS | SEX | FEMALE | ... | | CANCEL STATUS | CANCELLED |
| 2 | MAXIMUM COMMUNICATION PERIOD | 5 MINUTES OR LESS | AGE | 60'S | ... | | CANCEL STATUS | CANCELLED |
| 3 | SEX | MALE | OCCUPATION | OFFICE WORKER | ... | | CANCEL STATUS | CANCELLED |
| 4 | TOTAL COMMUNICATION PERIOD | MORE THAN 50 HOURS | MAXIMUM COMMUNICATION PERIOD | 10 - 30 MINUTES | ... | | CANCEL STATUS | CANCELLED |
| 5 | AGE | 10'S | - | - | ... | | CANCEL STATUS | CANCELLED |
| ... | ... | ... | ... | ... | ... | | ... | ... |

503

SUMMARY DATA

| SUMMARY KEY ITEM | SUM VALUE OF A | SUM VALUE OF B | ... |
|---|---|---|---|
| 1 | 30 | 52 | ... |
| 2 | 25 | 3 | ... |
| 3 | 47 | 8 | ... |
| 4 | 63 | 104 | ... |
| 5 | 22 | 36 | ... |
| ⋮ | ⋮ | ⋮ | ⋮ |

TRANSACTION DATA

| SUMMARY KEY ITEM | A | B | ... |
|---|---|---|---|
| 3 | 21 | 16 | ... |

UPDATE RECORD OF SUMMARY KEY ITEM 3

SUMMARY DATA

| SUMMARY KEY ITEM | SUM VALUE OF A | SUM VALUE OF B | ... |
|---|---|---|---|
| 1 | 30 | 52 | ... |
| 2 | 25 | 3 | ... |
| 3 | 68 | 24 | ... |
| 4 | 53 | 104 | ... |
| 5 | 22 | 36 | ... |
| ⋮ | ⋮ | ⋮ | ⋮ |

DATA ANALYSIS METHOD AND APPARATUS FOR DATA MINING

BACKGROUND OF THE INVENTION

1. Field of the Invention

The present invention relates to a data analysis method and apparatus for data warehouses and databases. More particularly, the invention pertains to a data analysis method and apparatus for data mining.

2. Description of Related Art

In the current-day technological field of information processing systems, there are two different kinds of information processing implementations; On-Line Transaction Processing (OLTP) serving to handle information and data in transaction process applications, and On-Line Analytical Processing (OLAP) serving to work with information and data in analytical process applications. In the OLTP, online realtime data management processing is carried out through use of databases, e.g., the OLTP is employed for updating data in repetitive routine tasks. In the OLAP, data analytical processing is performed through use of data warehouses, e.g., the OLAP is employed for supporting decision-making in end-user computing.

In the technical literature "DATA WAREHOUSE" (Y. Ishii, Japan Management Science Institute, 1996, pp. 232–237), the positioning of each of the OLTP and OLAP is reported as mentioned below: Conventionally, in extraction of information from a large-scale database, the OLTP system has been used to carry out such analysis as comparison between certain statistic data values and variable data values. Recently, however, since trends in the analytical needs of end users have been toward analyses of more complex and dynamic historical data, the OLTP system featuring centralized computing resources has become unsatisfactory due to difficulty in letting the end users be free to access and process desired data from anywhere whenever necessary. Therefore, at present, the OLAP system is becoming increasingly prevalent through which necessary data is extracted from a database and then transformed to meet particular requirements for individual users' applications.

Although the OLAP system mentioned above as a known arrangement is capable of accomplishing complex analyses in a diversity of applications, only the data transformed after extraction from the database is subjected to analytical processing in most cases. Hence, there is a problem that analytical processing is not allowed while reflecting updated data in realtime, and also it is difficult to construct a highly responsive system capable of operating efficiently based on analytical results.

SUMMARY OF THE INVENTION

It is therefore an object of the present invention to overcome the abovementioned disadvantages by enabling analytical processing while reflecting updated data in realtime and utilization of analytical results in realtime.

In accomplishing this object of the present invention and according to one aspect thereof, there is provided a data analysis method, comprising the following steps of:

a) generating summary data by summarizing transaction data input to a first server online, and storing the thus generated summary data into the first server;

b) reading in summary data from a second server connected with the first server, and updating the summary data stored in the first server by joining the thus read-in summary data to the summary data stored therein;

c) generating rules using the summary data stored in the first server, and storing the thus generated rules into the first server;

d) detecting data characteristics online using the summary data and rules generated and stored in the first server; and e) outputting results of detection of data characteristics.

In accordance with another aspect of the present invention, at step a), there is included a step of selecting a record of the input transaction data for adding only the record thus selected, and data summarization is performed upon completion of adding the thus selected record. Further, according to another aspect of the present invention, data summarization at step a) is accomplished by deriving a sum value, a maximum value, a minimum value, a mode value or a weighted sum value from the input transaction data.

Further, in accordance with another aspect of the present invention, a timing point of summary data joining at step b) is determined on the basis of a specific condition. Further, according to another aspect of the present invention, in summary data joining at step b), only the record of the summary data read from the second server, which is updated after the previous joining is joined to the summary data stored in the first server. Further, according to another aspect of the present invention, in summary data joining at step b), non-summary data read from the second server is temporarily transformed to summary data, which is then joined to the summary data stored in the first server.

Further, in accordance with another aspect of the present invention, a timing point of rule generation at step c) is determined on the basis of a specific condition. Further, according to another aspect of the present invention, in rule generation at step c), an If-Then rule (at least one If-Then rule) is extracted to represent such factors as regularity and causal relation latent in the summary data. Further, according to another aspect of the present invention, in rule generation at step c), an association rule (at least one association rule) for attributes latent in the summary data is extracted.

Further, in accordance with another aspect of the present invention, data characteristic detection at step d) is carried out upon completion of summarization processing of data selected on the basis of a specific condition. Further, according to another aspect of the present invention, in data characteristic detection at step d), it is judged whether a record of the updated summary data satisfies a condition part of a rule generated using non-updated summary data. Further, according to another aspect of the present invention, in data characteristic detection at step d), it is judged whether a record of the updated summary data satisfies a condition part and a conclusion part of a rule generated using non-updated summary data.

Further, in accordance with another aspect of the present invention, at step e), an output of results of data characteristic detection and a destination of output are determined on the basis of the results of data characteristic detection.

The above and other objects, features and advantages of the present invention will become more apparent from the following detailed description with reference to the accompanying drawings.

BRIEF DESCRIPTION OF THE DRAWINGS

FIG. 8 shows an example of transaction data;

FIG. 9 shows an example of summary data;

FIG. 10 shows an example of data in the second server;

FIG. 11 shows an example of summary data after joining data;

FIG. 12 shows an example of rules;

DETAILED DESCRIPTION OF THE PREFERRED EMBODIMENTS

The present invention will now be described in detail by way of example with reference to the accompanying drawings.

Figure 1:
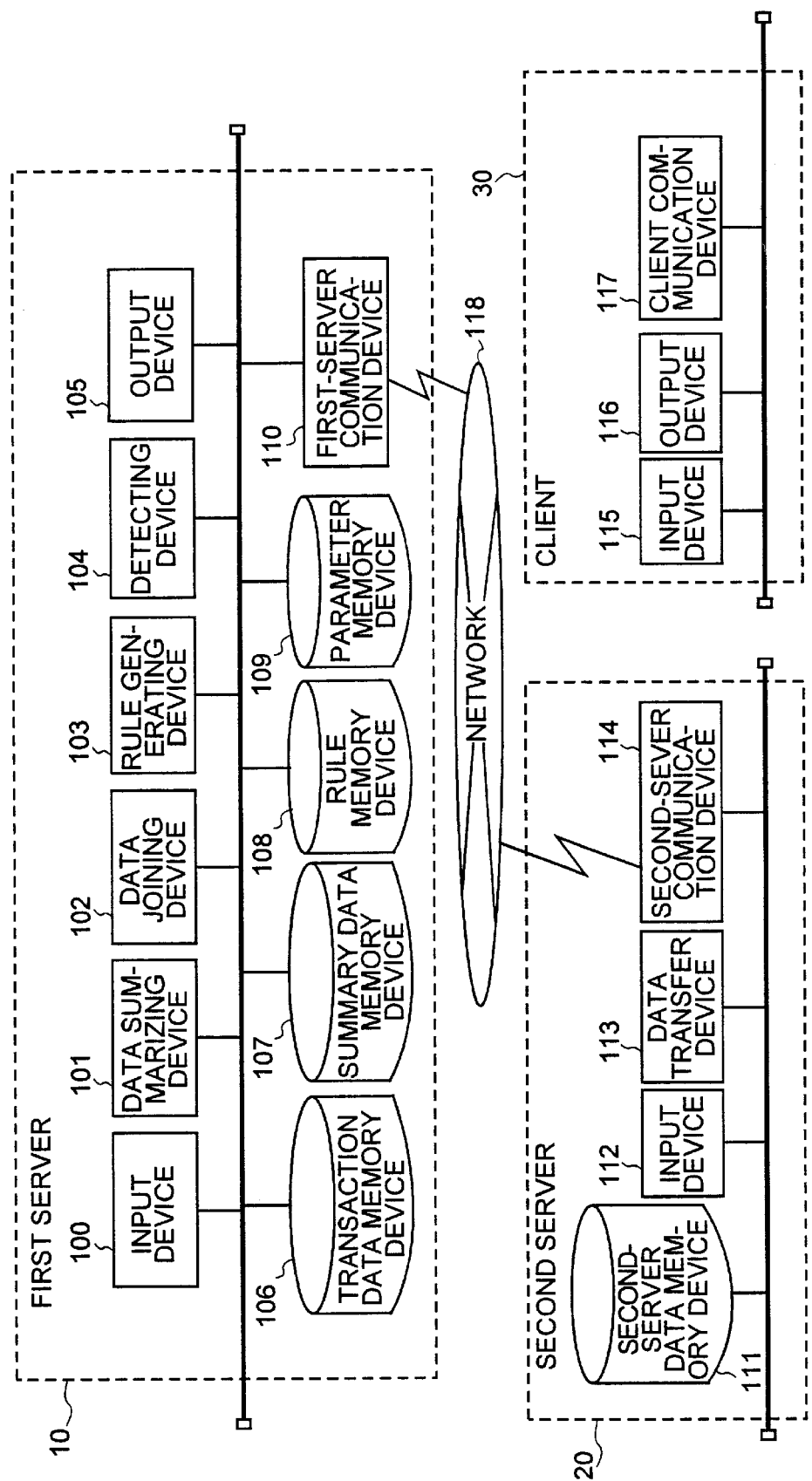
FIG. 1 is a schematic diagram showing a computer system configuration in a preferred embodiment of the present invention.

FIG. 1 shows a computer system configuration in a preferred embodiment of the present invention, and FIGS. 2 to 7 show respective processing flowcharts.

Referring to FIG. 1, the computer system comprises a first server 10, a second server 20, a client 30, and a network 118 for interconnecting them.

For information communication between the first server 10 and the second server 20, a first-server communication device 110 and a second-server communication device 114 are employed. For information communication between the first server 10 and the client 30, the first-server communication device 110 and a client communication device 117 are employed.

When transaction data is input online to the first server 10 through an input device 100, it is stored into a transaction data memory device 106. A data summarizing device 101 carries out online summarization of the transaction data input online to generate summary data. Then, the summary data thus generated is stored into a summary data memory device 107. A data joining device 102 joins second-server data stored in a second-server data memory device 111 to the summary data stored in the first server. A rule generating device 103 generates a rule (at least one rule) using the summary data, and the rule thus generated is stored into a rule memory device 108.

The first server 10 further comprises a detecting device 104, an output device 105, and a parameter memory device 109. Though not shown in FIG. 1, the first server 10 includes a processor for controlling the entire operation of the first server. There may also be provided such an arrangement that the functions of the data summarizing device 101, data joining device 102, rule generating device 103, and detecting device 104 are implemented as software programs in the processor for controlling the entire operation of the first server.

The second server 20 comprises the following devices; second-server data memory device 111, input device 112, data transfer device 113, and second-server communication device 114. The data transfer device 113 is used for transferring data between the first server 10 and the second server 20. Though not shown in FIG. 1, the second server 20 also includes a processor for controlling the entire operation of the second server.

The client 30 comprises the following devices; input device 115, output device 116, and client communication device 117. Though not shown in FIG. 1, the client 30 also includes a processor for controlling the entire operation of the client.

Figure 2:
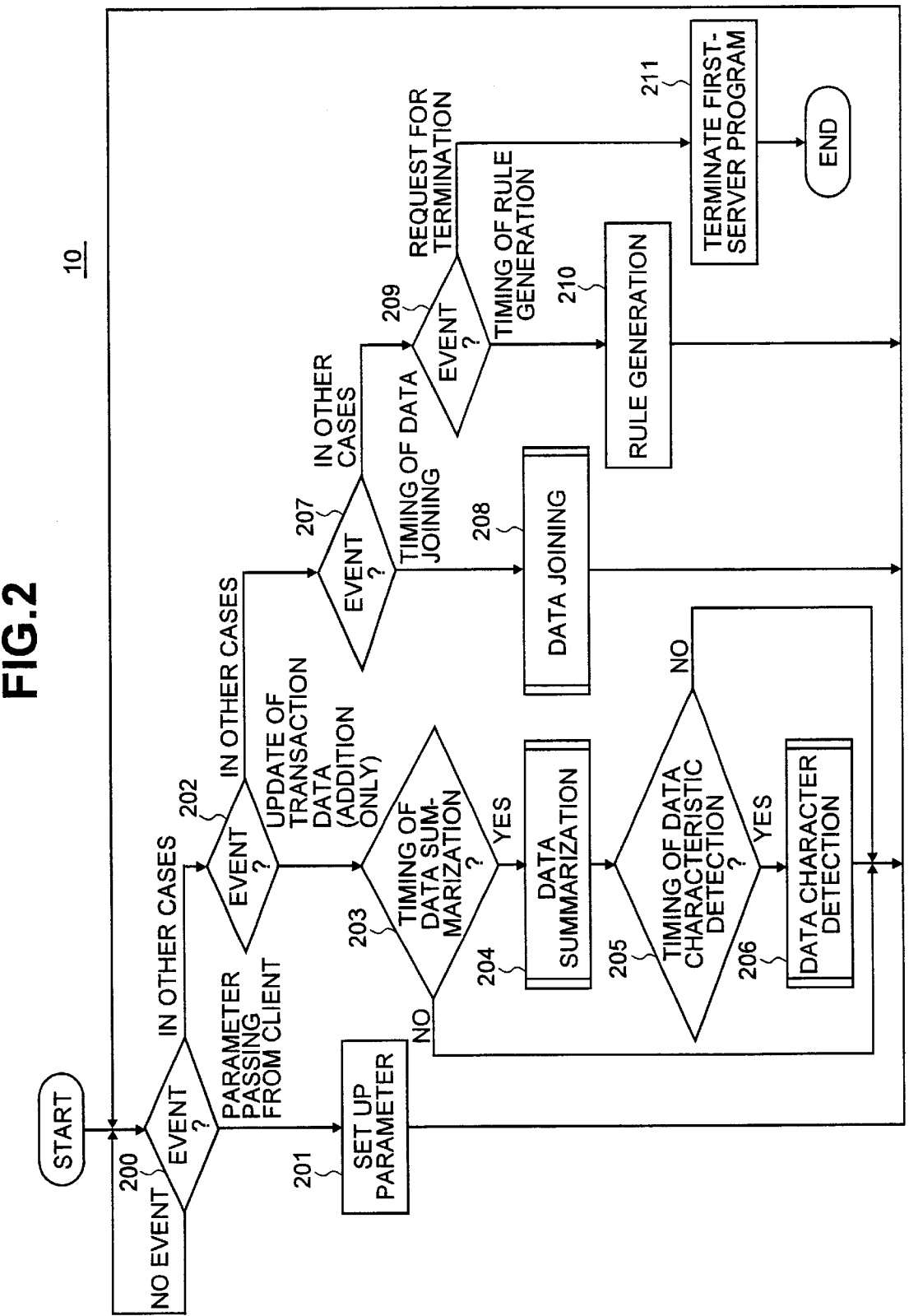
FIG. 2 is a flowchart showing a general processing procedure in a first server.
Figure 3:
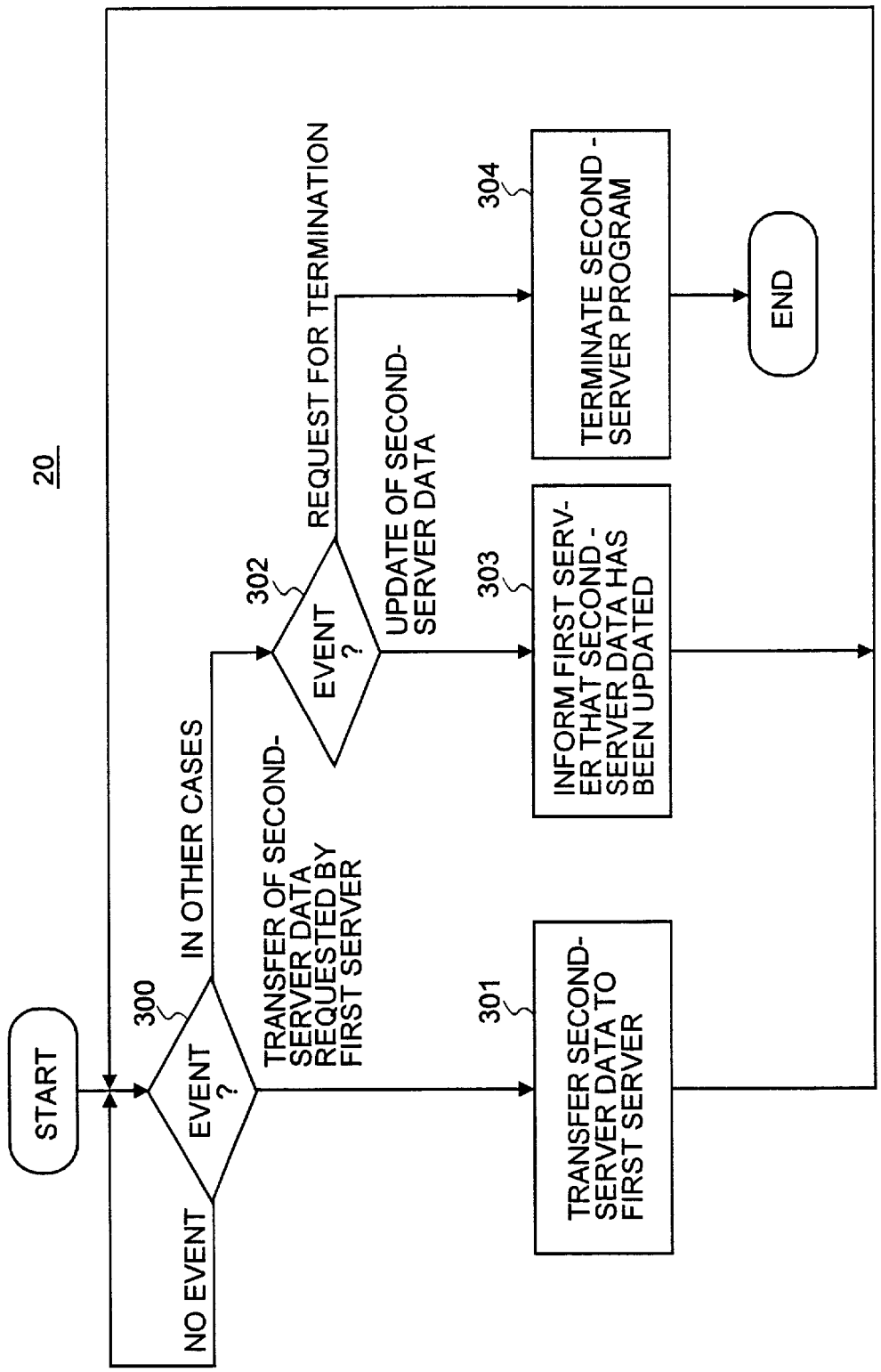
FIG. 3 is a flowchart showing a general processing procedure in a second server.
Figure 4:
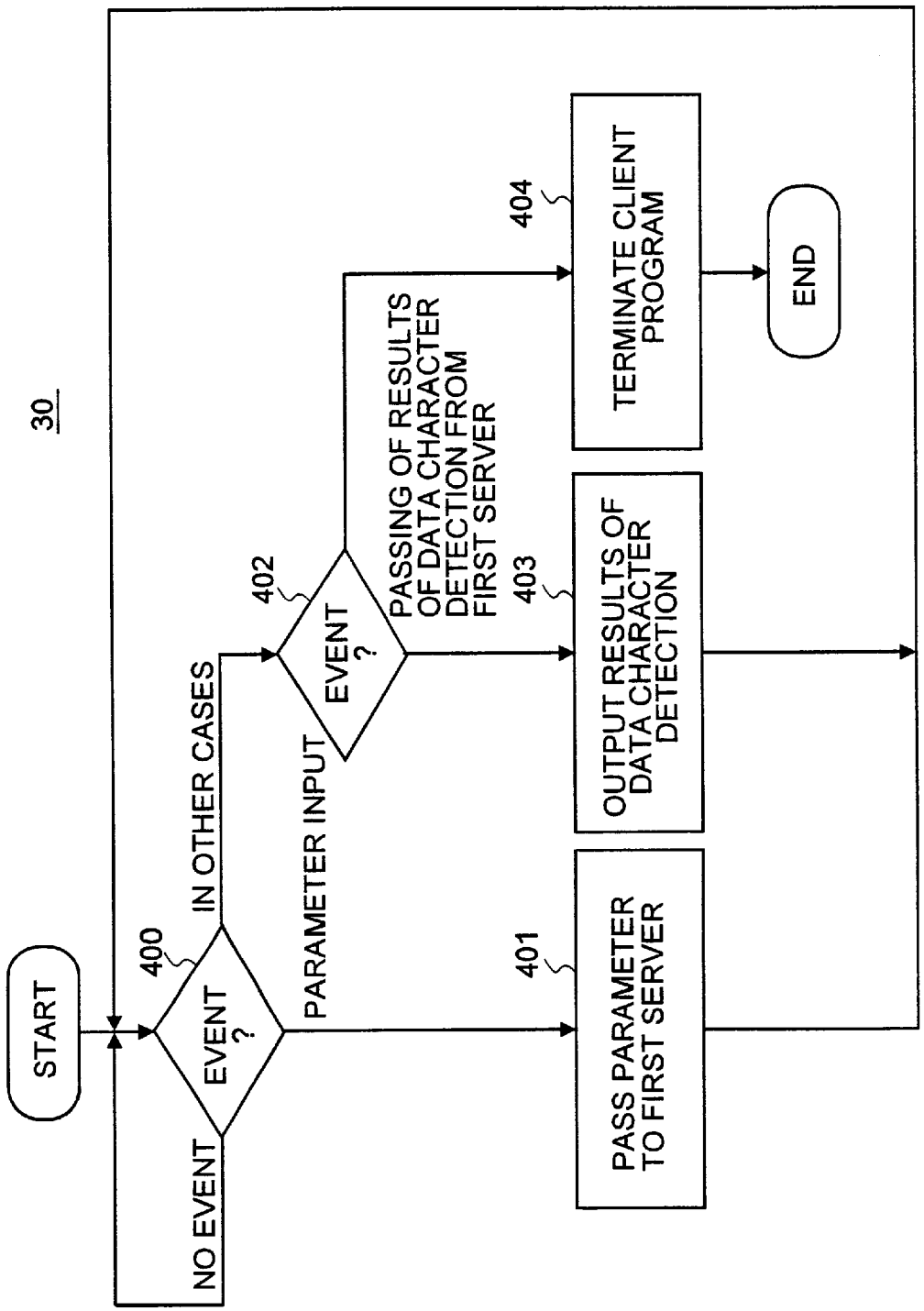
FIG. 4 is a flowchart showing a general processing procedure in a client.
Figure 5:
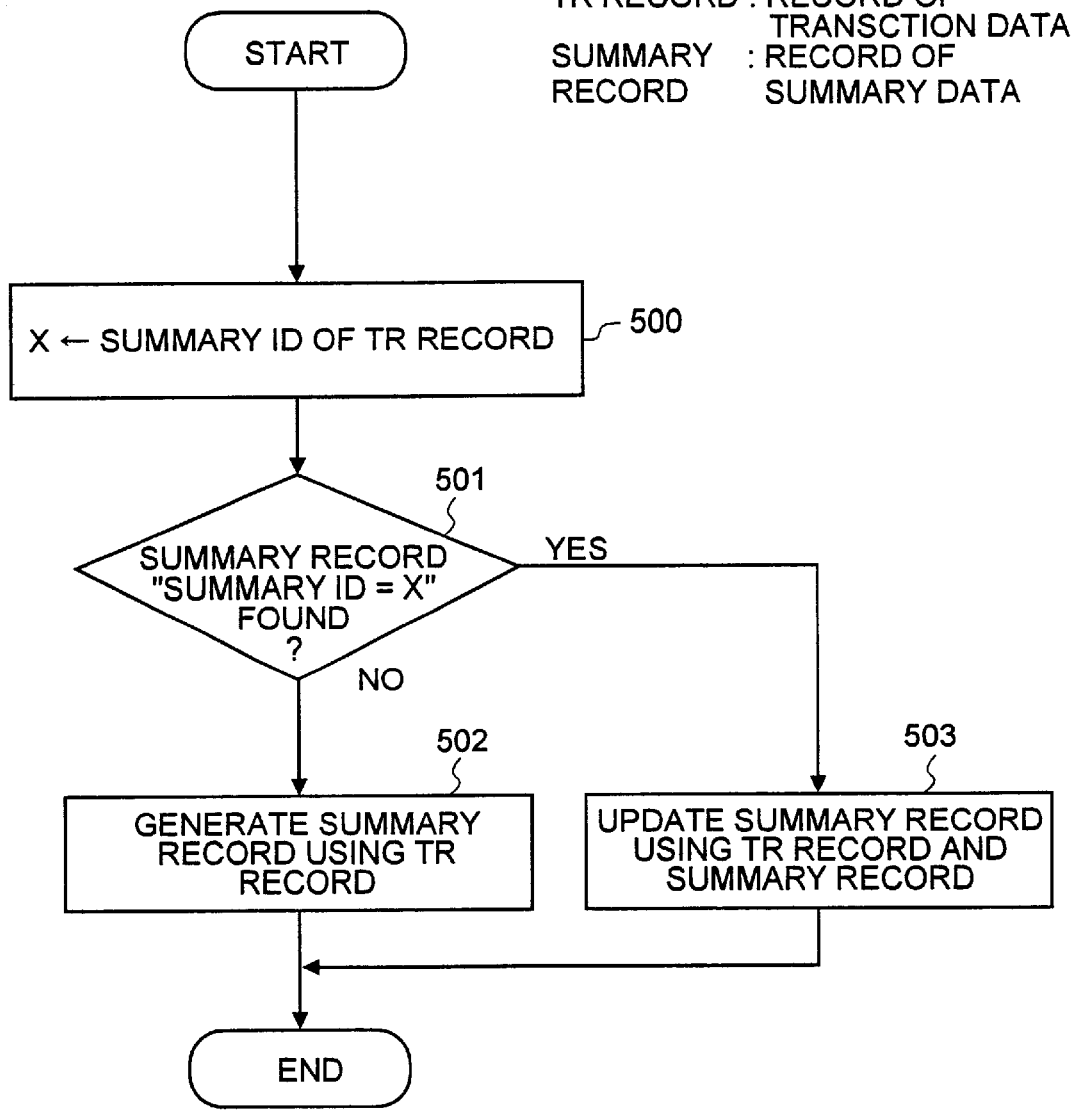
FIG. 5 is a flowchart showing a data summarization processing procedure in the first server.
Figure 6:
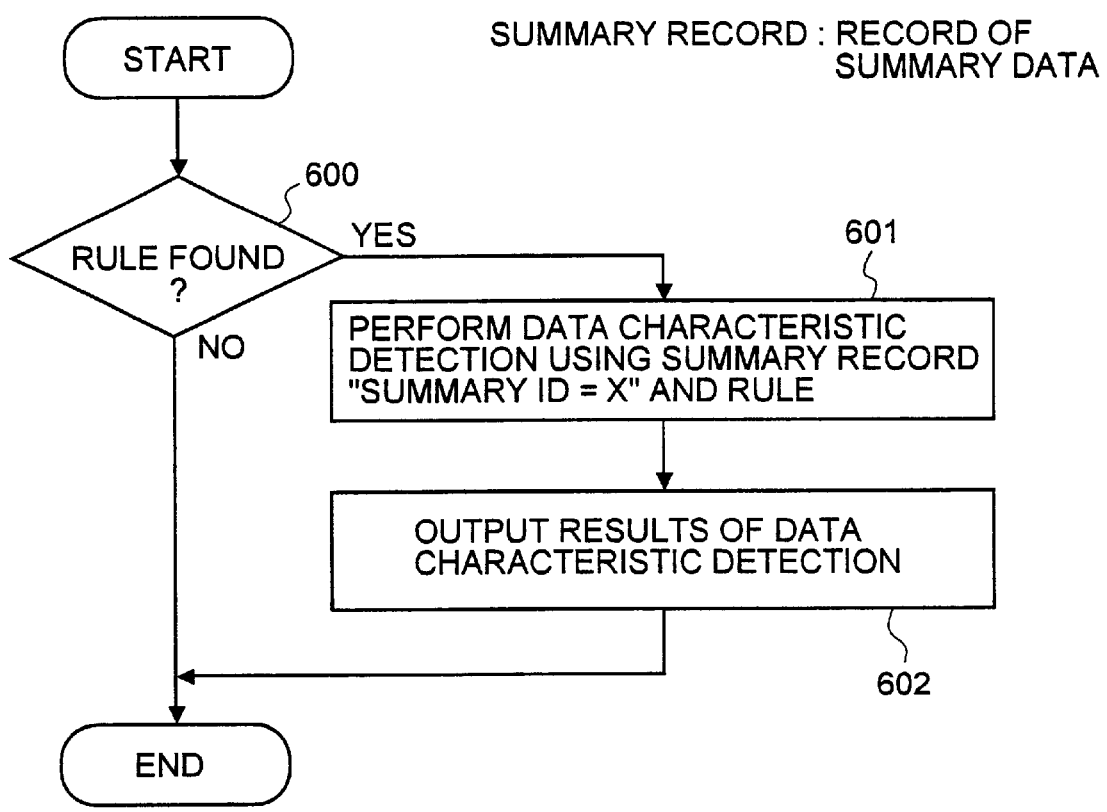
FIG. 6 is a flowchart showing a data characteristic detection processing procedure in the first server.
Figure 7:
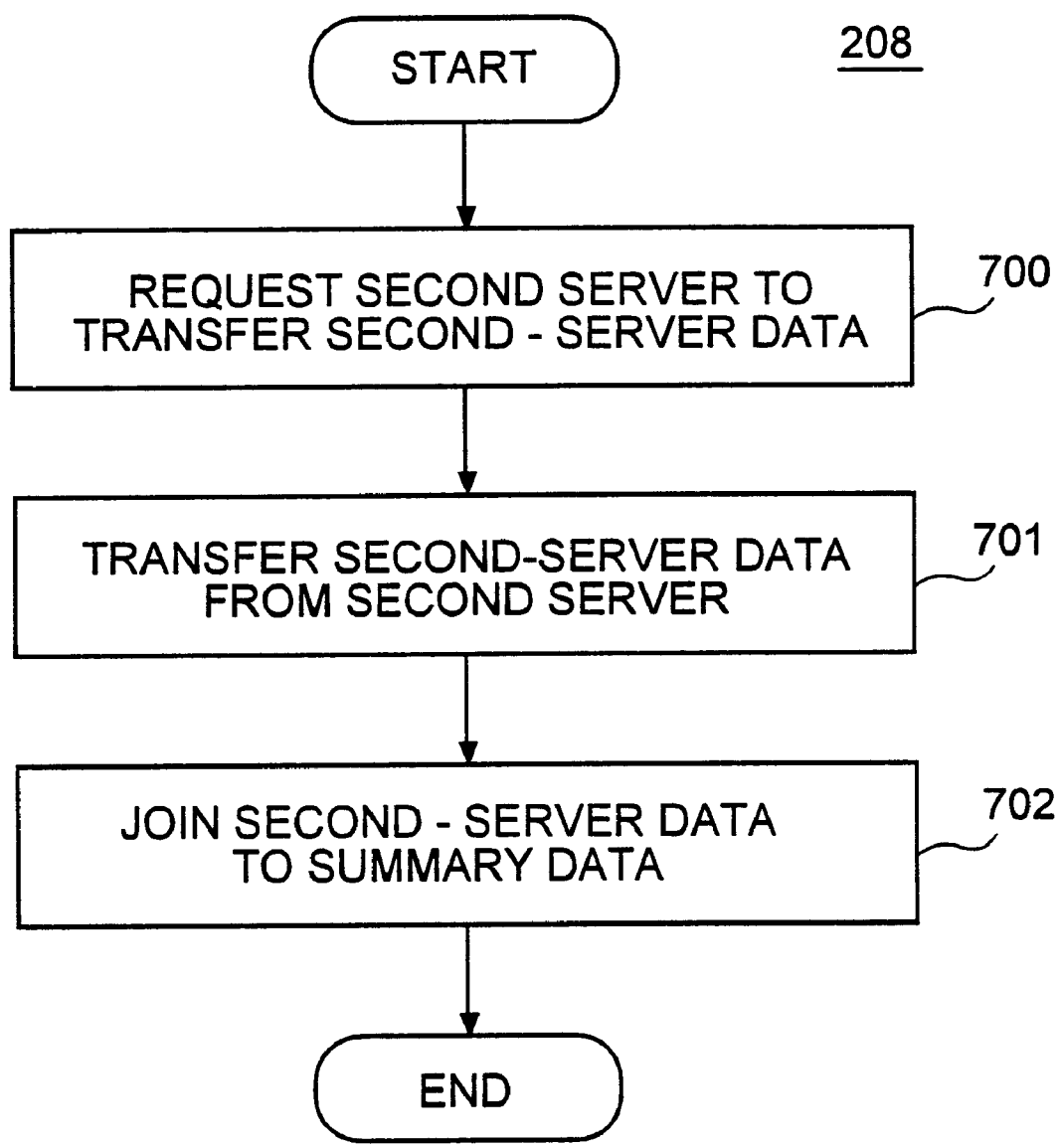
FIG. 7 is a flowchart showing a data join processing procedure in the first server.

Then, with reference to the flowcharts shown in FIGS. 2 to 7, the manner of operation of each part indicated in FIG. 1 is explained below. FIG. 2 shows a general processing procedure flow in the first server 10, FIG. 3 shows a general processing procedure flow in the second server 20, and FIG. 4 shows a general processing procedure flow in the client 30. FIG. 5 shows a processing procedure flow of data summarization 204 in the first server, FIG. 6 shows a processing procedure flow of data characteristic detection 206 in the first server 10, and FIG. 7 shows a processing procedure flow of data joining 208 in the first server 10.

With particular reference to FIG. 2, the following describes a general processing procedure flow in the first server 10:

At step 200, it is judged whether an event has occurred or not. If an occurrence of any event is recognized, a judgement is formed on the contents of the event. In case that an operation of a parameter passing from the client is found in this judgment, step 201 is selected. In other cases, step 202 is selected. If no occurrence of any event is recognized, the processing subsequent to step 200 is repeated until a request for termination is input.

At step 201, a parameter passed from the client is stored into a parameter memory device. The term "parameter" used herein indicates data for specifying the contents of each of data summarization processing, data characteristic detection processing, data join processing and rule generation processing when the client requests the first server to carry out each of them.

At step 202, a judgment is formed on the contents of the event. In case that an update of transaction data (addition only) is found in this judgment, step 203 is selected. In other cases, step 207 is selected.

At step 203, it is judged whether a timing point of data summarization is met or not. In case that the timing point of data summarization is met, step 204 is selected. In other cases, the processing subsequent to step 200 is repeated. In the present preferred embodiment, a point in time that addition of one record of transaction data is completed is used as a timing point of data summarization.

At step 204, online data summarization is carried out using the added transaction data. The term "transaction data" used herein indicates event data that is generated on occurrence of an event. As a concrete example of transaction data 106a, FIG. 8 shows "Call Detail Records (CDR)" used in the industrial field of telecommunications.

In data summarization processing 204, records of the transaction data shown in FIG. 8 are classified into groups on a value (summary ID) of a specific item (summary key item) according to the purpose of summarization, and each item is summarized for each classified group of records.

As a concrete example of summary data 107a generated through data summarization processing 204, FIG. 9 shows "call pattern data of individual users" employed in the industrial field of telecommunications. The details of the processing procedure of data summarization 204 will be described later.

At step 205, it is judged whether a timing point of data characteristic detection is met or not. In case that the timing point of data characteristic detection is met, step 206 is selected. In other cases, the processing subsequent to step 200 is repeated. In the present preferred embodiment, a point in time that data summarization is completed is used as a timing point of data characteristic detection.

At step 206, data characteristic detection processing is carried out. More specifically, a record of the summary data updated through addition of transaction data is compared with a condition part of each rule generated using non-updated summary data. Thus, a record satisfying the condition part of the rule is detected, and a prediction is made on an occurrence of a conclusion part of the rule. The details of the processing procedures of data characteristic detection and rule generation will be described later.

At step 207, a judgment is formed on the contents of the event. In case that a timing point of data joining is met, step 208 is selected. In other cases, step 209 is selected. In the present preferred embodiment, a point in time that a request for data joining is made by the client is used as a timing point of data joining.

At step 208, second-server data stored in the second-server data memory device 111 is joined to the summary data stored in the summary data memory device 107, and the resultant joined data is written as new summary data over the previous summary data for updating. The summary data thus updated is stored into the summary data memory device 107.

Where another data is used as second-server data 111a or data stored in another server is used, the resultant joined data is not written over the previous summary data 107, i.e., the previous summary data is not updated. Instead, the resultant joined data is stored as different data into the summary data memory device 107. The term "second-server data 111a" used herein indicates master data in which each record can be identified by each value (join ID) of a specific item (join key item), and each record consists of an attribute or a combination of plural attributes, and no time-series elements are provided.

A concrete example of second-server data 111a is "user's attribute data" employed in the industrial field of telecommunications. FIG. 10 shows an example of secondserver data 111a, and FIG. 11 shows an example of summary data 107a after data joining. The details of the processing procedure of data joining 208 will be described later.

At step 209, a judgment is formed on the contents of the event. In case that a timing point of rule generation is met, step 210 is selected. In case that a request for terminating execution of first-server program is found, step 211 is taken. In the present preferred embodiment, a point in time that a request for rule generation is made by the client is used as a timing point of rule generation.

At step 210, a rule is generated using summary data stored in the summary data memory device 107. The term "rule generation" used herein indicates an operation in which such factors as regularity and causal relation contained in data are extracted in a form of If-Then rule. This rule extraction can be practiced using a conventional technique. As disclosed in Japanese Unexamined Patent Publication No. 93159/1995, a relation between each condition which consists of an attribute and its value (e.g., "X=A", "Y=B") is extracted in a form of "If X=A Then Y=B", where "X" and "Y" represent names of attributes, and "A" and "B" represent values of attributes "X" and "Y" respectively. "X=A" is referred to as a condition part, and "Y=B" as a conclusion part. In some cases, a condition part may include a combination of plural conditions (X1=A1 & X2=A2 & . . . ).

In If-Then rule extraction, all possible combinations of conditions are evaluated on a certain rating scale for defining a conclusion part of a rule. Thus, a specific number of combinations of conditions (for each condition part) are determined in descending order of importance on the rating scale.

At least one rule thus extracted is stored into the rule memory device 108. FIG. 12 shows an example of a set of rules 108a.

At step 211, execution of the first-server program is terminated.

Then, with particular reference to FIG. 3, the following describes a general processing procedure flow in the second server 20:

At step 300, it is judged whether an event has occurred or not. If an occurrence of any event is recognized, a judgement is formed on the contents of the event. In case that a request for transference second-server data 111a has been made by the first server 10, step 301 is selected. In other cases, step 302 is selected. If no occurrence of any event is recognized, the processing subsequent to step 300 is repeated.

At step 301, the data transfer device 113 reads out second-server data from the second-server data memory device 111 and transfers it to the first server 10.

At step 302, a judgment is formed on the contents of the event. In case that an update of second-server data 111a is found in this judgment, step 303 is selected. In case that a request for terminating execution of second-server program is found, step 304 is selected.

At step 303, the first server 10 is informed that second-server data 111a has been updated.

At step 304, execution of the second-server program is terminated.

Then, with particular reference to FIG. 4, the following describes a general processing procedure flow in the client 30:

At step 400, it is judged whether an event has occurred or not. If an occurrence of any event is recognized, a judgment is formed on the contents of the event. In case that an input of a parameter is found in this judgment, step 401 is selected. In other cases, step 402 is selected. If no occurrence of any event is recognized, the processing subsequent to step 400 is repeated.

At step 401, the input parameter is passed to the first server 10.

At step 402, a judgment is formed on the contents of the event. In case that the passing of results of data characteristic detection from the first server 10 is found, step 403 is selected. In case that a request for terminating execution of client program is found, step 404 is selected.

At step 403, the result of data characteristic detection passed from the first server 10 is output onto the output device 116.

At step 404, execution of the client program is terminated.

Then, with particular reference to FIG. 5, the following describes a processing procedure flow of online data summarization 204 in the first server 10:

At step 500, the latest record of transaction data is read out of the transaction data memory device 106, and a value of a summary key item (summary ID) in the read-out record is assigned to variable "X". A record of transaction data is hereinafter referred to as a transaction record.

At step 501, it is judged whether or not a record of "Summary ID=X" is found in summary data stored in the summary data memory device 107. In case that the record of "Summary ID=X" is not found in this judgment, step 502 is selected. In case that the record of "Summary ID=X" is found, it is read out and then step 503 is selected. A record of summary data 107a is hereinafter referred to as a summary record.

Figure 13:
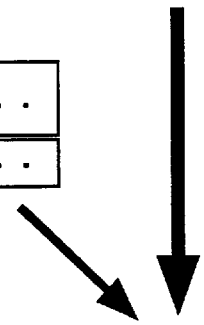
FIG. 13 shows an example of summary data generation processing.

At step 502, a summary record of "Summary ID=X" is generated using the transaction record read out at step 500. More specifically, on the assumption that a value of item A is regarded as a sum value of item A ("A" is a name of an arbitary item which needs to be summarized), the transaction record read out at step 500 is stored as a summary record of "Summary ID=X" into the summary data memory device 107. FIG. 13 shows an example of processing at step 502. In this processing, in some cases, there are plural items which need to be summarized.

Figure 14:
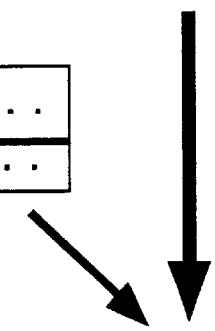
FIG. 14 shows an example of summary data update processing.

At step 503, the summary record is updated using the transaction record read out at step 500 and the summary record of "Summary ID=X" found at step 501. More specifically, a value of item A in the transaction record is added to a value of item "Sum Value of A" in the summary record of "Summary ID=X", and the resultant value thus attained is written as new summary record of "Summary ID=X" over the previous summary record for updating. The summary record thus updated is stored into the summary data memory device 107. FIG. 14 shows an example of processing at step 503.

Then, with particular reference to FIG. 6, the following describes a processing procedure flow of data characteristic detection 206 in the first server 10:

At step 600, it is judged whether or not a rule is found (stored) in the rule memory device 108. In case that no rule is found, the processing is terminated. In case that a rule is found, the rule is read out and then step 601 is selected.

At step 601, summary record of "Summary ID=X" is read out of the summary data memory device 107. Then, the summary record thus read out is compared with a condition part of a rule (at least one rule) read out previously, and it is judged whether the summary record satisfies the condition part of the rule fully. In case that the summary record satisfies the condition part, it is recognized that "a summary record satisfying the condition part of the rule is found" as the result of data characteristic detection. In case that the summary record does not satisfy the condition part, it is recognized that "no summary record satisfying the condition part of the rule is found" as the result of data characteristic detection. The statement "a summary record satisfying the condition part of the rule is found" mentioned herein signifies that an occurrence of an event satisfying the conclusion of the rule is predicted, and the statement "no summary record satisfying the condition part of the rule is found" mentioned herein signifies that no occurrence of an event satisfying the conclusion part of the rule is predicted.

At step 602, regardless of whether the result of data characteristic detection at step 601 indicates that "a summary record satisfying the condition part of the rule is found" or that "no summary record satisfying the condition part of the rule is found", the result of data characteristic detection is passed to the client 30.

Then, with particular reference to FIG. 7, the following describes a processing procedure flow of data joining 208 in the first server 10:

At step 700, the data transfer device 113 of the second server 20 is requested to transfer second-server data 111a therefrom.

At step 701, the data transfer device 113 of the second server 20 transfers all the records of second-server data 111a to the first server 10.

At step 702, summary data 107a is read out of the summary data memory device 107. Then, a join key item (e.g., telephone number) for joining the second-server data 111a (transferred at step 701) to the summary data 107a is read out from the summary data memory device 107. The term "join key item" used herein indicates an item which serves as a primary key for one data and as a foreign key for the other data in join processing. Thereafter, using the read-out join key item as a primary key for one data and as a foreign key for the other data, the second-server data 111a is joined to the summary data 107a. The resultant joined data is written as new summary data over the previous summary data for updating. The summary data thus updated is stored into the summary data memory device 107.

The present invention may also be arranged in modified embodiments as described hereinbelow.

A first modified embodiment of the present invention may be carried out as follows: While a point in time that addition of one record of transaction data is completed is used as a timing point of data summarization at step 203 in the aforementioned preferred embodiment, there may be provided such a modified arrangement as mentioned below. Only the point in time that addition of a transaction data record satisfying a specific condition is completed is used as a timing point of data summarization. "A transaction data record satisfying a specific condition" mentioned herein means a record in which a specific item satisfies a specific value (e.g., "Sex=Male"). In this modified embodiment, the efficiency of data summarization processing can be enhanced according to the purpose of data character detection processing.

A second modified embodiment of the present invention may be carried out as follows: Similarly to the first modified embodiment, a timing point of data summarization at step 203 in the aforementioned preferred embodiment may also be modified as mentioned below. Only the point in time that transaction data record addition processing selected at a specific rate is completed is used as a timing point of data summarization. "Transaction data record addition processing selected at a specific rate" mentioned herein signifies the addition selected at predetermined intervals of number of records or the addition selected at predetermined intervals of time. In this modified embodiment, the efficiency of data summarization processing can be enhanced though there is a possibility that the accuracy of data characteristic detection may become lower to a certain extent.

A third modified embodiment of the present invention may be carried out as follows: While a point in time that data summarization is completed is used as a timing point of data characteristic detection at step 205 in the aforementioned preferred embodiment, there may be provided such a modified arrangement as mentioned below. Only the point in time that data summarization processing selected at a specific rate is completed is used as a timing point of data characteristic detection. "Data summarization processing selected at a specific rate" mentioned herein signifies the data summarization selected at predetermined intervals of count of summarization or the addition selected at predetermined intervals of time. In this modified embodiment, the efficiency of data characteristic detection processing can be enhanced through there is a possibility that the accuracy of data characteristic detection may become lower to a certain extent.

A fourth modified embodiment of the present invention may be carried out as follows: While a point in time that a request for data joining is made by the client 30 is used as a timing point of data joining at step 207 in the aforementioned preferred embodiment, there may be provided such a modified arrangement as mentioned below. A timing point of data joining is taken at a point in time that the number of summary data records stored in the summary data memory device 107 reaches a multiple of a specific value, a point in time that an update count of summary data reaches a multiple of a specific value, a point in time that an update count of second-server data stored in the second server data memory device 111 reaches a multiple of a specific value, or a point in time after a lapse of a specific time interval. Further, a plurality of these points in time may be used in combination. In this modified embodiment, data join timing can be controlled automatically for proper reflection of a change in data.

A fifth modified embodiment of the present invention may be carried out as follows: While master data in which each record can be identified by a join ID, an attribute or a combination of plural attributes is represented by each record, and no time-series elements are provided is used as second-server data at step 208 in the aforementioned preferred embodiment, there may be provided such a modified arrangement as mentioned below. Data not satisfying the above requirements (e.g., transaction data) is also stored in the second-server data memory device 111. Only when the first server requests the second server 20 to transfer second-server data 111a, data is transformed temporarily to satisfy the above requirements (e.g., by means of summarization (the second server 20 is also provided with a data summarizing device in this case)) and then the transformed data is transferred to the first server 10. In this modified embodiment, various forms of data can be used as second-server data.

A sixth modified embodiment of the present invention may be carried out as follows: While a point in time that a request for rule generation is made by the client 30 is used as a timing point of rule generation at step 209 in the aforementioned preferred embodiment, there may be provided such a modified arrangement as mentioned below. A timing point of rule generation is taken at any of the points in time indicated in the fourth modified embodiment. Further, a plurality of these points in time may be used in combination. In this modified embodiment, rule generation timing can be controlled automatically for proper reflection of a change in data.

A seventh modified embodiment of the present invention may be carried out as follows: While a rule is generated using the conventional technique of If-Then rule extraction disclosed in Japanese Unexamined Patent Publication No. 93159/1995 at step 210 in the aforementioned preferred embodiment, there may be provided such a modified arrangement as mentioned below. As reported in the technical literature "Visualization of Association Rules" (T. Fukuda, et al., Shingaku Gishou, DE95-6, pp. 41–48, 1995), an association rule among attributes latent in data is extracted in a form "X→Y" ("X" and "Y" indicate attributes) for rule generation. In this modified embodiment, detection processing can be performed according to various data characteristics.

An eighth modified embodiment of the present invention may be carried out as follows: While a sum value of each item which needs to be summarized is calculated in data summarization processing at steps 502 and 503 in the aforementioned preferred embodiment, there may be provided such a modified arrangement as mentioned below. In data summarization processing, a maximum value, minimum value, mode value or weighted sum value (refer to Equations (1)) of each item is calculated. Equations (1) are shown below.

Expressing a value of "n"th data as "A (n)" and a weighted sum value up to "n"th data as "S (n)", $$S(n)=A(n) \text{ (when n=1)}$$
$$S(n)=\alpha A(n)+(1-\alpha)S(n-1) \text{ (when } n \geq 2) \text{ where, } 0.5 < a \leq 1 \quad (1)$$

One or plural values indicated above may also applied to each item. In this modified embodiment, it is possible to provide a system capable of extracting and utilizing data characteristics in a variety of aspects.

A ninth modified embodiment of the present invention may be carried out as follows: While a summary record is compared with a condition part of a rule (at least one rule) and a judgment is formed to check whether the summary record satisfies the condition part of the rule at step 601 in the aforementioned preferred embodiment, there may be provided such a modified arrangement as mentioned below. Instead of comparison between a summary record and a condition part of a rule, the summary record is compared with the rule (at least one rule) and a judgment is formed to check whether the summary record satisfies both the condition part and the conclusion part of the rule. In this modified embodiment, by detecting an occurrence of a summary record not satisfying both a condition part and a conclusion part of a rule, it becomes possible to indicate a rule stability or a timing point of rule regeneration.

A tenth modified embodiment of the present invention may be carried out as follows: At step 602 in the aforementioned preferred embodiment, regardless of whether the result of data characteristic detection at step 601 indicates that "a summary record satisfying the condition part of the rule is found" or that "no summary record satisfying the condition part of the rule is found", the result of data characteristic detection is passed to the client. Instead, there may be provided such a modified arrangement as mentioned below. Only when the result of data characteristic detection indicates that "a summary record satisfying the condition part of the rule is found", the result of data characteristic detection is passed to the client, or only when the result of data characteristic detection indicates that "no summary record satisfying the condition part of the rule is found", the result of data characteristic detection is passed to the client.

An eleventh modified embodiment of the present invention may be carried out as follows: Similarly to the tenth modified embodiment, the processing for passing the result of data characteristic detection to the client may also be modified as mentioned below. The output destination of the result of data characteristic detection is changed to the first or second server, and the client inquires of the first or second server about the result of data characteristic detection as required. Further, the result of data characteristic detection stored in the first or second server may be summarized or analyzed statistically.

A twelfth modified embodiment of the present invention may be carried out as follows: Similarly to the tenth modified embodiment, the processing for passing the result of data characteristic detection to the client may also be modified as mentioned below. Depending on whether the result of data characteristic detection indicates that "a summary record satisfying the condition part of the rule is found" or that "no summary record satisfying the condition part of the rule is found", the first or second server is selected as the output destination of the result of data characteristic detection.

In any of the tenth, eleventh and twelfth modified embodiments, it is possible to provide a system having higher expandability for using the result of data characteristic detection.

A thirteenth modified embodiment of the present invention may be carried out as follows: While all the records of second-server data 111a are transferred from the second server 20 at step 701 for data joining at step 702 in the aforementioned preferred embodiment, there may be provided such a modified arrangement as mentioned below. Only the second-server summary data record updated after transfer are transferred to the first server for joining them to the first-server summary data. Any record of the second-server summary data not subjected to the above processing is kept intact as in the previous state. In this modified embodiment, a range of data which need to be joined can be narrowed to enhance the efficiency of data join processing.

A fourteenth modified embodiment of the present invention may be carried out as follows: While the aforementioned preferred embodiment comprises compositional elements including one first server 10, one second server 20 and one client 30, there may be provided such a modified arrangement as mentioned below. One first server 10, zero or plural second servers 20, and one or plural client 30 are arranged as compositional elements. Namely, no second server 20 is provided where it is not required to join customer attribute data to summary data. Plural second servers are provided where it is required to perform joining between summary data and respective attribute data stored in plural servers. In this modified embodiment, it is possible to form a system having higher expandability for analyzing and using data.

A fifteenth modified embodiment of the present invention may be carried out as follows: The processing procedures in any of the aforementioned preferred embodiment and the modified embodiments stated above are stored in a storage medium as computer-readable programs. Then, when it is required to run these programs, they are loaded onto each memory of the first server 10, second server 20 and client 30.

A sixteenth modified embodiment of the present invention may be carried out as follows: The processing procedures in any of the aforementioned preferred embodiment and the modified embodiments stated above are stored in a memory device as computer-readable programs. Through the network, these programs are distributed to each of the first server 10, second server 20 and client 30.

As set forth hereinabove and according to the present invention, online data summarization processing can be carried out at the time of transaction data input. Further, according to the present invention, it is possible to join summary data which are distributively stored in different servers. Still further, according to the present invention, rules can be generated using summary data created online. Furthermore, according to the present invention, online data characteristic detection processing is allowed at the time of transaction data input.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A data analysis method using a first server and a second server, comprising the steps of:

a) generating summary data by summarizing transaction data input to said first server, and storing the thus generated summary data into said first server;

b) reading in summary data from said second server connected with said first server, and updating the summary data stored in said first server by joining the thus read-in summary data to the summary data stored in said first server;

c) generating rules using the summary data stored in said first server, and storing the thus generated rules into said first server;

d) selecting the transaction data to be added into the summary data based on conditions of the rules from transaction data added after the rules were generated; and modifying the summary data using transaction data that is selecting in said selecting step.

2. A data analysis method as claimed in claim 1, wherein said generating summary data is accomplished by deriving a sum value, a maximum value, a minimum value, a mode value or a weighted sum value from the input transaction data.

3. A data analysis method as claimed in claim 1, wherein a timing point of summary data joining at said step b) is determined on the basis of a specific condition.

4. A data analysis method as claimed in claim 1, wherein, in summary data joining at said step b), only the record updated after the previous joining in the summary data read from said second server is joined to the summary data stored in said first server.

5. A data analysis method as claimed in claim 1, wherein, in summary data joining at said step b) non-summary data read from said second server is temporarily transformed to summary data, which is then joined to the summary data stored in said first server.

6. A data analysis method as claimed in claim 1, wherein a timing point of rule generation processing at said step c) is determined on the basis of a specific condition.

7. A data analysis method as claimed in claim 1, wherein an If-Then rule is extracted to represent one of the conditions of the rules.

8. A data analysis method as claimed in claim 1, wherein an association rule is extracted to represent one of the conditions of the rules.

9. A data analysis system comprising:

data summarizing means for generating summary data by summarizing data extracted from transaction data and master data, and storing the thus generated summary data;

rule generating means for generating rules using the summary data, and storing the thus generated rules;

detecting means for detecting the transaction data to be added into the summary data based on conditions of the rules from transaction data added after the rules were generated; and means for modifying the summary data using the detected transaction data.

10. A data analysis apparatus system as claimed in claim 9, wherein said data joining means reads in non-summary data from said second server, temporarily transforms the non-summary data into summary data, and joining the thus transformed summary data to the summary data stored in said first server for updating.

11. A data analysis apparatus system including a server, said server comprising:
   data summarizing means for generating summary data by summarizing input transaction data, and storing the thus generated summary data into said server;
   rule generating means for generating rules using the summary data stored in said server, and storing the thus generated rules into said server;
   means for selecting the transaction data to be added into the summary data based on conditions of the rules from transaction data added after the rules were generated; and
   means for modifying the summary data using transaction data selected by the selecting means.

12. A computer-readable storage medium containing programs for carrying out a data analysis method using a first server connected with a second server, said data analysis method comprising the steps of:
   a) generating summary data by summarizing transaction data input to said first server, and storing the thus generated summary data into said first server;
   b) reading in summary data from said second server connected with said first server, and updating the summary data stored in said first server by joining the thus read in summary data to the summary data stored in said first server;
   c) generating rules using the summary data stored in said first server, and storing the thus generated rules into said first server;
   d) selecting the transaction data to be added into the summary data based on conditions of the rules from transaction data added after the rules were generated; and
   modifying the summary data using transaction data that is selecting in said selecting step.

13. A computer-readable storage medium containing programs for carrying out a data analysis method using a first server connected with a second server, said data analysis method comprising the steps of:
   a) generating summary data by summarizing transaction data input to said first server, and storing the thus generated summary data into said first server;
   b) temporarily transforming non-summary data read out of said second server, and joining the thus transformed summary data to the summary data stored in said first server;
   c) generating rules using the summary data stored in said first server, and storing the thus generated rules into said first server;
   d) selecting the transaction data to be added into the summary data based on conditions of the rules from transaction data added after the rules were generated; and
   modifying the summary data using transaction data that is selecting in said selecting step.

14. A data analysis system as claimed in claim 9,
   wherein the data analysis system comprises first server and second server connected mutually the transaction data is stored in the first server and the master data is stored in the second server.

15. A data analysis apparatus system as claimed in claim 11,
   wherein the selecting means first selects the transaction data based on summary ID, then selects based on the conditions of the rules.

* * * * *